United States Patent [19]

Wittich

[11] Patent Number: 4,953,917
[45] Date of Patent: Sep. 4, 1990

[54] STEERING-BRAKE SYSTEM

[75] Inventor: Kurt Wittich, Flörsbachtal, Fed. Rep. of Germany

[73] Assignee: Mannesmann Rexroth GmbH, Fed. Rep. of Germany

[21] Appl. No.: 298,114

[22] Filed: Jan. 18, 1989

[30] Foreign Application Priority Data

Jan. 18, 1988 [DE] Fed. Rep. of Germany ....... 3801228

[51] Int. Cl.$^5$ ...................... B60T 11/24; B60T 15/36; B62D 11/08
[52] U.S. Cl. .................................. 303/961; 188/354; 188/16; 303/52
[58] Field of Search ........................... 303/9.61, 50-56; 188/16, 354; 60/547.1, 561, 567, 581, 584

[56] References Cited

U.S. PATENT DOCUMENTS

| | | | |
|---|---|---|---|
| 3,339,986 | 9/1967 | Lowin et al. | 188/354 X |
| 3,400,788 | 9/1968 | Brace | 188/354 |
| 3,827,765 | 8/1974 | Husted | 303/9.61 X |
| 3,834,769 | 9/1974 | Just | 303/9.61 |
| 4,125,234 | 11/1978 | Tregre | 188/354 X |
| 4,223,954 | 9/1980 | Margetts | 303/9.61 |
| 4,505,519 | 3/1985 | Muterel | 303/9.61 |

FOREIGN PATENT DOCUMENTS

| | | |
|---|---|---|
| 635149 | 1/1962 | Canada .................. 188/354 |
| 1026804 | 2/1981 | Canada . |
| 1480204 | 6/1971 | Fed. Rep. of Germany . |
| 2108607 | 5/1983 | United Kingdom . |

Primary Examiner—Douglas C. Butler
Attorney, Agent, or Firm—Burns, Doane, Swecker & Mathis

[57] ABSTRACT

An off-road vehicle has ground supports on each side which can be simultaneously braked, or independently braked to aid in steering. A braking system includes a brake valve device which feeds high fluid pressure to a pair of reversing valves. The reversing valves deliver the high pressure to respective wheel brake cylinders disposed on opposite sides of the vehicle. The reversing valves and brake valve device are controlled by a common pedal which comprises separately or simultaneously actuable half-pedals. Each half-pedal actuates the brake valve device and a respective reversing valve such that when both half-pedals are depressed the system operates in a dual-sided braking mode, and when only one half-pedal is depressed the system operates in a braked-steering mode. The system can be shifted directly from the dual-sided braking mode to a brake-steering mode by simply releasing one of the half-pedals without having to first release all braking action.

15 Claims, 4 Drawing Sheets

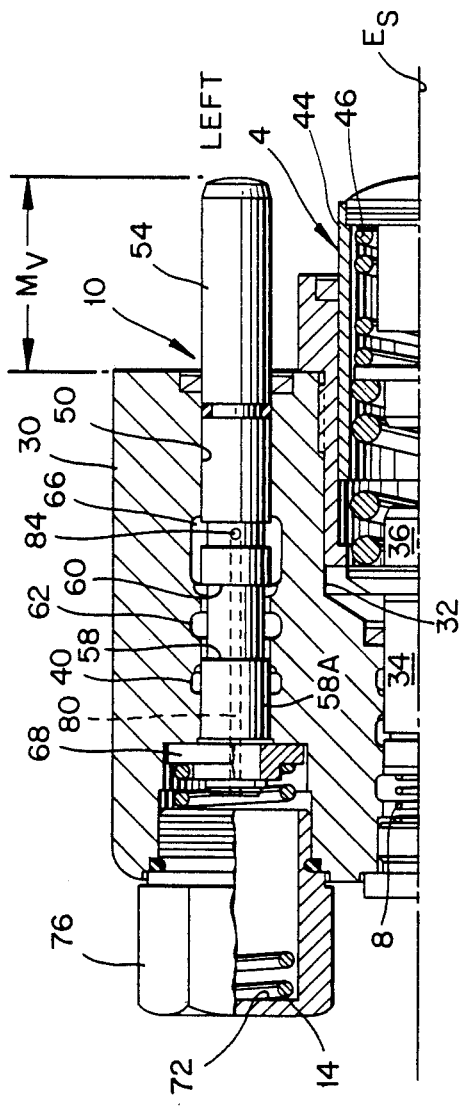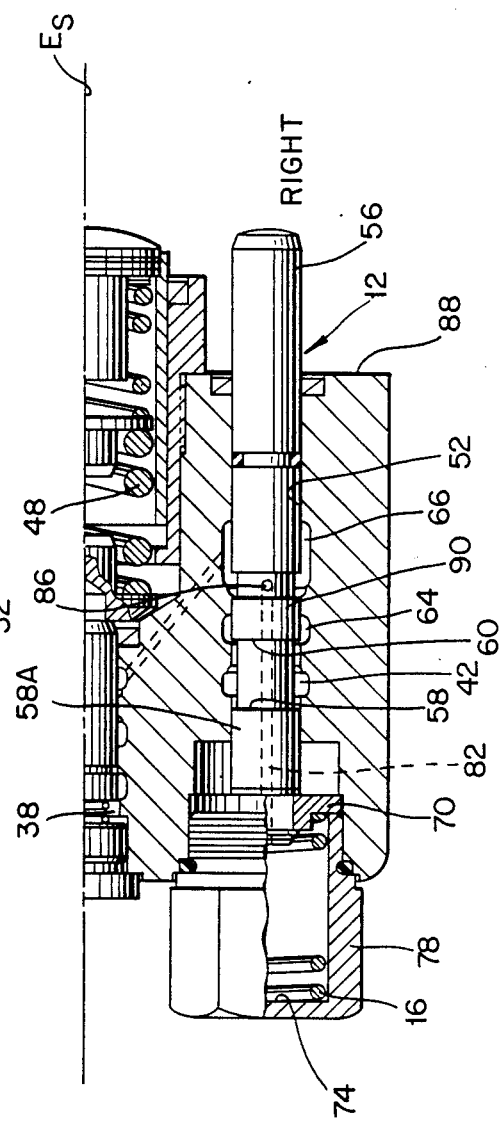
FIG. 2A
FIG. 2B

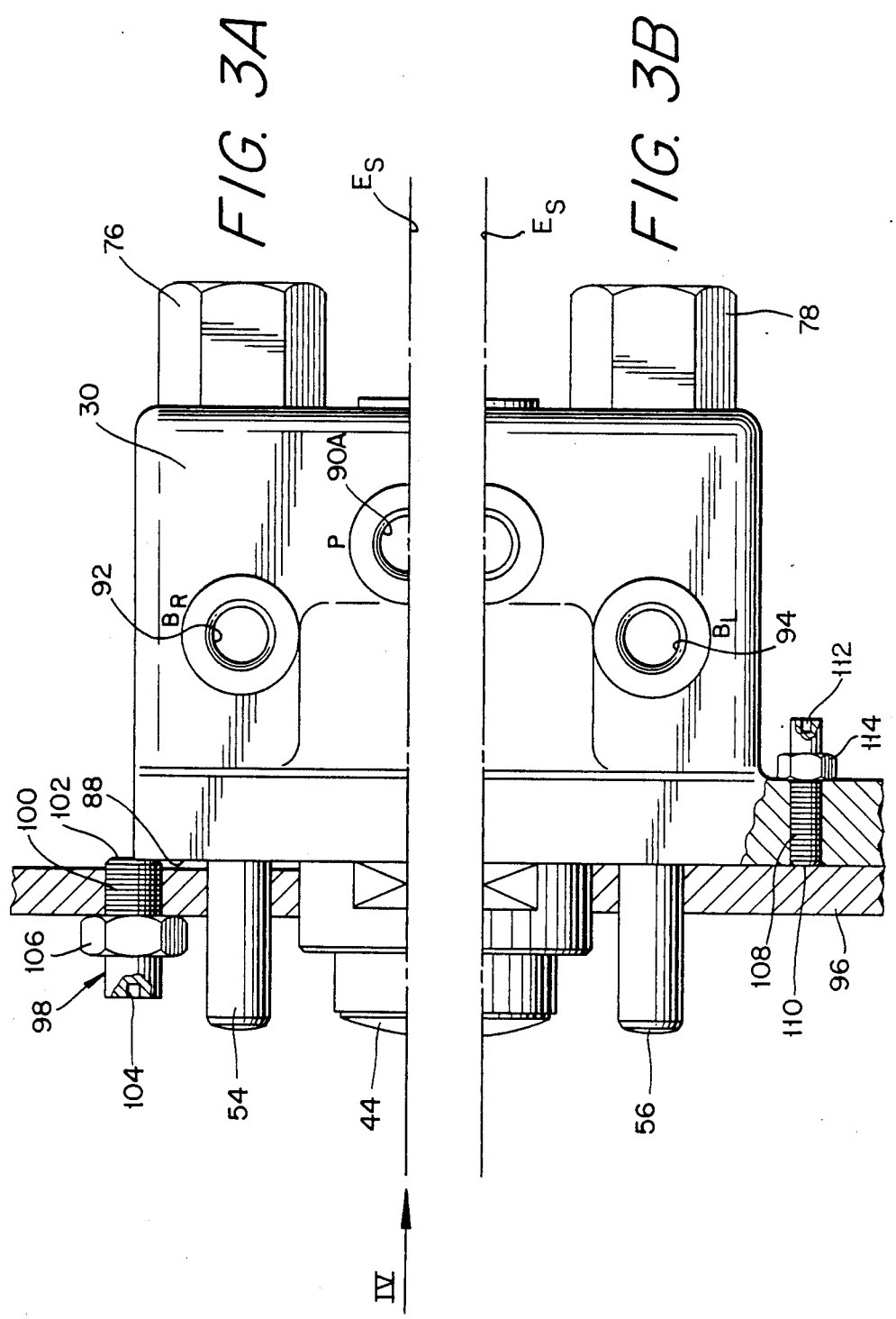

4,953,917

STEERING-BRAKE SYSTEM

BACKGROUND OF THE INVENTION

The invention relates to a brake-steering system, particularly for off-road vehicles, for example, tractors for agriculture or forestry or an excavator-loader from the field of construction machines, wherein the steering of the vehicle is aided by actuation of brakes on either side of the vehicle.

Brake-steering systems, which most often operate a hydraulically are used conventionally to aid in steering vehicle by selective braking of the ground support elements located on the side of the vehicle facing the center of curvature of the turn being made, i.e., the curve-internal side of the vehicle. In this connection, the procedure is already known of providing for each side of the vehicle a separate main brake cylinder with which the left and right brake circuits can be connected separately. To reduce the investment of technical devices, it has been proposed to couple a common main brake cylinder with a hand-actuated reversing valve, an approach (depending on the switch position) with which either braking on one side of the vehicle or braking on both sides can be achieved.

However, because hand-switching can impair driving safety, a brake-steering system has become known in accordance with the disclosure of German Patent No. DE-AS 14 80 204, which calls for double pedal comprised of two half-pedals for the left and right sides of the vehicle. When one half-pedal is actuated, only one side of the vehicle is braked, but by pressing on both half-pedals both sides of the vehicle can be braked, i.e., dual-sided braking. The valves of the reversing-valve device for impacting the left or right wheel-brake cylinder in this known case are constructed as seat valves, which are held in closed position, against the brake pressure delivered from the main brake cylinder, the holding force being established, by the restoring force of the double pedal. If one half-pedal is pressed, then the valve body of the associated reversing valve is lifted off the valve seat, so that the brake pressure delivered from the main brake cylinder is conducted to the associated wheel-brake cylinder in order to initiate brake-steering.

Apart from the fact that this known brake-steering system of German Patent No. 14 80 204 requires relatively space-consuming tubing arrangements in the vehicle, it has been found that this type of brake-steering cannot cope with certain critical driving situations, particularly in difficult terrain. This can be traced to the fact that with such a system a reduction of pressure on the wheel-brake cylinder on only one side of the vehicle cannot be achieved directly from the dual-sided braking operation. That is, a brake-steering phase cannot be entered directly from a dual-sided braking phase. Rather, the dual-sided braking process must first be cut off, i.e., the brake must be fully released, before the operator can actuate a single half-pedal to initiate a brake-steering operation.

Such a procedure runs counter to the natural reaction patterns of the vehicle driver. Particular in off-road operation, the vehicle must often be braked and steered at the same time. In this already critical driving situation, the driver can therefore consider releasing the brake only if the natural reaction pattern is nullified by way of a mental reasoning process. This means that hitherto in such critical driving situations, the driver had to do without the aid of brake-steering. Even if the driver employed brake-steering by a repeated releasing of the brakes, such a procedure resulted in a loss of time, which in particularly critical driving situations can impair safety.

One purpose of the invention, therefore, is to create a fluid-operated brake-steering system which occupies minimal space, and which can be safely operated in all driving situations that the vehicle encounters.

SUMMARY OF THE INVENTION

According to the invention the construction of the reversing valve provides in an advantageous manner the possibility of reducing pressure on the wheel-brake cylinders of the left and right sides of the vehicle separately and independently of each other from the dual-sided braking operation without having to first remove the brake pressure on the other side of the vehicle. This makes it possible to reduce the pressure of the brake circuit on one side of the vehicle directly from a dual-sided braking operation. This means that after braking the wheels on both sides of the vehicle, one can initiate brake-steering without having to release the brake completely. The transition from a dual-sided braking process to brake-steering can thus be made without loss of time, and thus the operating safety of the vehicle is increased. At the same time, this function can be achieved with a minimum requirement of structural space, since additional tubing arrangements become unnecessary with the brake-valve device and the reversing valves housed in a single unit. An additional advantage is that because of the use of reversing valves, no reaction forces influencing the position of the valves can occur during the build-up of pressure, so that the control characteristics of the reversing valves can more simply be adjusted to the total system. Above and beyond that, the operator is always working against a predetermined pedal counterpressure which is independent of brake fluid pressure; this improves the operating feel.

Preferably, each of the reversing valves forms a brake line port which communicates with a respective wheel brake cylinder and a movable valve body spool having channel means for communicating the brake line port selectively with the brake valve device and the low pressure region. As a result, the flow routes of the fluid (for example, hydraulic fluid), can be kept as short as possible. In addition, this structure permits the use of simple measures, namely, the appropriate choice of positive or negative overlaps, to achieve an adjustment of the opening characteristics of the reversing valves to the pressure production of the brake-valve device. As an alternative, bored control holes can be provided which entail the same advantages as described above.

Preferably, a restoring spring is provided for each reversing valve. Each spring is arranged to act against a surface of its respective valve body in a direction opposite the direction in which the respective half-pedal acts on the respective valve body to hold the valve body in its first position. As a result, the restoring springs for the double pedal become components of the reversing valves, which can save additional structural space and reduce the production costs. An additional restoring spring on the pedal is not needed.

In order to produce the force that is independent of the brake pressure, against which the valve bodies of the reversing valves are moved by actuation of the half-pedals, it is preferable that each valve body contains an internal passage communicating the low pressure region with the surface against which the restoring spring acts. In this way, one face of the valve bodies is always connected to a uniform, low level of pressure, and the passage formed in the valve body does not require any additional structural space in the steering-brake unit.

The invention's construction of the steering-brake system even opens up the possibility of integrating a main brake cylinder in the steering-brake unit as a brake-valve device. However, it has been found that we get a particularly good characteristic of the pressure build-up in the two brake circuits on the left and right sides if the brake-valve device is arranged symmetrically to the reversing valve. Preferably, the steering-brake unit comprises a housing which encases the brake valve device and the reversing valves. That housing is attached to a panel of the vehicle. An adjusting device is provided for adjusting the location of the housing relative to the pivot connection of the pedal with the panel. An advantage in this connection is that, for example, a conventional brake valve can be used in the design as a continually adjustable 3/5-way valve. Such known brake valves likewise operate against a spring force. This can advantageously be relied upon to keep the one actuating body of the brake valve continually in contact with the double pedal.

The inclusion of the two reversing valves in a common steering-brake unit ensures that these valves operate uniformly when the two half-pedals are pressed at the same time, thus ensuring a uniform pull of the brakes on both sides of the vehicle.

Preferably, the brake valve device and reversing valves are mounted in a housing which is attached to a vehicle panel. Means is provided for adjusting the location of the housing relative to the panel. This development makes possible an adjustment of the reversing valve relative to the position of the pivot point of the double pedal which compensates for tolerances that result from the vehicle construction. This results in a further possibility of correction to compensate for any difference that may occur in the responsiveness of the two reversing valves.

An adjustable stop member is provided for each half-pedal to ensure that the double pedal always occupies a defined position, which eliminates undesirable noise production.

Preferably, each of the reversing valves and brake valve device includes a slidable valve body. The axes of the valve bodies are disposed in a common plane which creates a relatively flat construction of the steering-brake unit.

Particularly when the brake-valve device has a brake valve designed as a continuously adjustable 3/5-way valve, whose initial pressure varies according to a reproducible characteristic with the travel route of the valve body, it is advantageous that the brake valve device be constructed such that the pressure intensity of the high pressure fluid by the brake valve device varies in accordance with the amount of depression of the pedal.

The responsiveness is additionally improved if the steering-brake system operates hydraulically.

BRIEF DESCRIPTION OF THE DRAWING

The objects and advantages of the invention will become apparent from the following detailed description of preferred embodiments thereof in connection with the accompanying drawings in which like numerals designate like elements, and in which:

FIGS. 2A and 2B are cross-sectional views of a steering-brake unit according to the invention with FIG. 2A showing a neutral position of the valves and FIG. 2B a working position of the valves;

FIGS. 3A and 3B are side views of the steering-brake unit with FIG. 3A showing an adjusting device and FIG. 3B showing a second design of the adjusting device for adjusting the position of the steering-brake unit with reference to a vehicle body panel;

DETAILED DESCRIPTION OF PREFERRED EMBODIMENTS OF THE INVENTION

Figure 1:
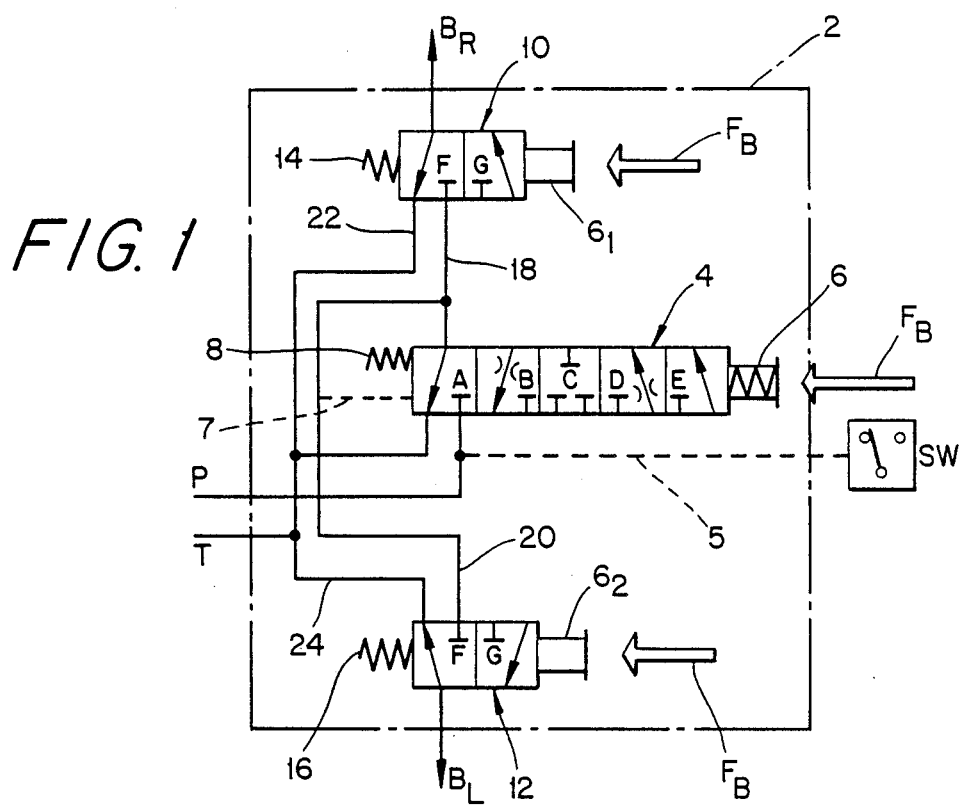
FIG. 1 is a block schematic diagram of the steering-brake system according to the invention.

In FIG. 1 there is shown a hydraulic diagram of a steering-brake system for an off-road vehicle, for example, a tractor for agriculture or forestry or an excavator-loader. The system includes a steering-brake unit 2 by means of which the wheel-brake cylinders (not shown in detail) can be applied with brake pressure. A brake line $B_R$ runs to the wheel-brake cylinders on the right side of the vehicle. A brake line $B_L$ runs to at least one wheel-brake cylinder on the left side. The steering-brake unit 2 is fed by a system pressure P, which is provided, for example, by a hydraulic storage unit accumulator. The unit is connected to a reservoir by a conduit T. A pressure switch SW is provided which is actuated by a control line 5.

A brake valve 4 is provided which can be constructed as a continuously adjustable 3/5-way valve. A brake pedal 6 enables the valve slide of the brake valve to be moved against the force of a restoring spring 8 and the brake pressure (valve 4 and control line 7) into the different switch positions A, B, C, D, and E. The brake valve 4 may have a conventional structure, and need not be described in detail.

Associated with the brake valve 4 is a pair of reversing valves 10 and 12, which preferably are of the same construction and preferably comprise 3/2-way valves. The reversing valves 10 and 12 are actuated by half-pedals $6_1$ and $6_2$, respectively, of the brake pedal 6 which is constructed as a double pedal. The half-pedals are actuated against the force of restoring springs 14 or 16, which are preferably adjustable in strength. Thus, if either of the half-pedals is depressed, the associated reversing valve 10 or 12 will be displaced along with the brake valve 4. If both of the half-pedals are depressed, both of the reversing valves 10, 12 will be displaced along with the brake valve 4.

The arrangement is such that in the neutral position A shown in FIG. 1, in which the pedal force $F_B$ is equal to zero, the brake lines $B_R$ and $B_L$ are connected to the reservoir via conduit T. In the same way, brake-pressure lines 18 or 20 for the right or left side of the vehicle, respectively, in neutral switch position A are connected to the conduit T and thus are at low pressure. As the valve slide of the brake valve 4 is displaced to positions D and E by actuation of a half-pedal, an increasing brake pressure builds up in the brake-pressure lines 18 and 20, with which the wheel-brake cylinders (not shown) are actuated. At the same time as the actuation of the brake valve 4, the reversing valve 10 or 12 is moved from switch position F to switch position G, in which the brake-pressure line 18 or 20 is connected with the brake line $B_R$ or $B_L$. It is preferable for the reversing valves 10 or 12 to be moved into switch position G shortly before the brake valve 4 reaches position D to cause system pressure P to be fed into the brake-pressure lines 18 or 20. In switch position G, reservoir connections 22 or 24 of the reversing valves 10 or 12 are blocked.

When both half-pedals $6_1$ and $6_2$ are impacted at the same time, a normal braking process of the vehicle is achieved. For the case in which only one half-pedal $6_1$ is actuated, the valve bodies of the brake valve 4 and the reversing valve 10 are moved, while the valve body of reversing valve 12 remains in switch position F. A pressure build-up results in this way only in brake line $B_R$, which runs to at least one wheel-brake cylinder on the right side of the vehicle. In this operating situation, the steering of the vehicle to the right in a turn can be aided. The case is similar for one-sided actuation of the left half-pedal $6_2$.

The steering-brake actuation can also be achieved directly from a normal braking process without having to return the brake valve 4 to neutral. That is, when the double pedal 6 is being pressed (i.e., when the two half-pedals $6_1$ and $6_2$ are being pressed at the same time) if one half-pedal (for example, half-pedal $6_1$) is released, the restoring spring 14 causes the valve body of the reversing valve 10 to move from switch position G into switch position F. The brake valve 4 is not influenced in its switch position by this movement, since the still-depressed left half-pedal $6_2$ determines the position of the valve body of the brake valve. Thus, directly after the release of the right half-pedal $6_1$, the pressure is reduced in the right brake line by way of the reservoir connection 22, and thus the steering of the vehicle to the left can be aided directly from the braking process.

It will be appreciated from the depiction in FIG. 1 that the valves 4, 10 and 12 are housed in a common steering-brake block, in order thereby to keep the fluid-carrying control lines as short as possible. The subsequent figures will now be referred to for further describing details of the common steering-brake block. To simplify the description, those parts of the steering-brake system which have already been referred to in describing FIG. 1 will be labeled with the same reference numerals.

In FIGS. 2A and 2B, there is depicted a housing 30 of the steering-brake block which has a longitudinal symmetry plane $E_S$ that runs through the axis of the brake valve 4. In order to contain the brake valve 4, the housing has a stepped hole 32 which slidingly accommodates valve bodies 34 and spring retainer 36. By way of the valve body 34, which is capable of being moved to the left against the force of the restoring spring 8, a controlled pressure build-up and reduction takes place in a brake pressure chamber 38, by way of which the pressure lines 18 or 20 (not shown in detail) are fed. The brake pressure lines 18 or 20 lead into brake-pressure ports 40 or 42 of the reversing valves 10 or 12 located on each side of the brake valve 4. These brake-pressure ports are formed by annular grooves in the housing 30 of the steering-brake block.

The valve body 34 and spring retainer 36 of the brake valve 4 are actuated by way of a trunk piston 44, which is biased by outwardly series-connected actuating springs 46 and 48. That is, the free end of the spring 46 acts against the trunk piston 44, and the free end of the spring 48 acts against a flange which is rigidly joined to the valve body 36. The end of the trunk piston 44 that projects from the steering-brake block 30 is of calotte or cap-like shape, and is in contact with a double pedal (not shown in detail).

For the reversing valves 10 and 12, the housing 30 has longitudinal holes 50 and 52 drilled symmetrically relative to the symmetry plane $E_S$, in each of which a valve body 54 or 56 can be accommodated by sliding it in and sealing it from the outside. By way of the valve body 54 or 56, switching is achieved between switch positions F and G as explained in connection with FIG. 1. For this purpose the bored hole 50 or 52 is widened in two places to receive lands 58A, 90 which define control edges 58, 60, respectively. Between the control edges 58 or 60 a brake-line port 62 or 64 is formed, which is open to the right or left brake line $B_R$ or $B_L$. The right control edge 60 of FIG. 2 is associated with a reservoir pressure chamber 66, which has a connection with the reservoir connection line T. The valve bodies 54 and 56 are acted upon by the restoring springs 14 and 16. One end of each restoring spring bears against a shoulder part 68 or 70 of the valve body 54 or 56, and the other end bears against a bottom surface 72 or 74 of a hollow adjusting screw 76 or 78. By way of the shoulder part 68 or 70, the valve body 54 or 56 is displaced by the spring 14 or 16. The interior of the hollow screw 76 or 78 that accommodates the spring 14 or 16 is continually in contact with the reservoir pressure chamber 66 by way of an axial hole 80 or 82 and a radial hole 84 or 86 formed in the valve body 54 or 56, so that the restoring force for the valve slide 54 or 56 depends solely on the spring characteristic of the restoring spring 14 or 16.

FIG. 2A shows the neutral position of the valves of the steering-brake system, whereas FIG. 2B shows the actuating position of the valves. The depiction in FIG. 2 makes it clear that the movement of the trunk piston 44 of the brake valve 4 takes place at the same time as the movement of the valve bodies 54 and 56. This means that the distance $M_V$, by which the valve bodies of the brake valve 4 or the reversing valve 10 or 12 project from a face 88 of the steering-brake block 30, changes as the double pedal is being actuated.

In the neutral position (i.e., position F of FIG. 1) shown in FIG. 2A, the land 58A overlies the brake-pressure port 40 (or 42) whereby the control edge 58 blocks a connection between the brake-pressure port 40 and the brake-line port 62, whereas by way of a channel in the valve body 54 located between the land edges 58, 60 a connection is produced between the tank pressure chamber 66 and the brake-line port 62. When the valve body 54 is moved to the left against the force of the restoring spring 14, the control edge 60 is displaced so that the connection between the brake-line port 62 and the tank pressure chamber 66 is blocked, whereupon a connection is produced between the brake-pressure port 40 and the brake-line port 62, as depicted in FIG. 2B. Simultaneously with the movement of the valve body 54, an increasing brake pressure builds up as a result of the actuation of the brake valve 4, as a result of which the vehicle wheels are braked. It can be seen from the depiction in FIG. 2B that in the position G of the reversing switch 12, the connection of the interior of the hollow screw 78 with the tank pressure chamber 66 is maintained. Because of the valve-body land 90, the reservoir pressure chamber 66 is blocked from the brake-line connection 64 which now carries the pressure.

When the half-pedal that has moved the reversing valve 12 out of the neutral position is released, the restoring spring 16 pushes the valve body 56 so that the end of the valve body 56 projects from the steering-brake block 30. This causes a restoring movement of the half-pedal to the initial position, without thereby influencing the steering-brake circuit on the other side of the vehicle in any way whatsoever.

FIGS. 3A, 3B show a view of the steering-brake block 30, as in FIG. 2, but from the other side, with FIG. 3A showing an initial variant and FIG. 3B a further variant of an adjusting device for the steering-brake block 30. To simplify the description, those parts in FIG. 3A which correspond to the elements of the variant shown in FIGS. 2A, 2B will be labeled with identical reference numerals. It can be seen that the housing 30 of the steering-brake block has three tapped holes 90A, 92 and 94 for the connection of the system pressure line P and the two brake lines $B_R$ and $B_L$. For the attachment of the housing 30 to a vehicle body panel 96, which is usually constituted by the dashboard between the engine compartment and the passenger compartment or driver's cab of the vehicle, fastening screws (not shown in detail) are provided. To adjust the alignment of the steering-brake block 30 to the vehicle body panel 96, it is preferable to provide several adjusting devices 98 distributed across the face 88. In the initial variant shown in FIG. 3A of the adjusting device, a threaded bolt 100 is accommodated in a tapped hole in the vehicle body panel 96, and has an end face 102 braced against a face 88 of the steering-brake block 30. A slot 104 in the other face of the threaded bolt 100 makes possible a turning of the threaded bolt 100. By way of a counter nut 106, the adjusting device 98 is secured when the position of the steering-brake block 30 relative to the vehicle body panel 96 is set.

In the variant of the adjusting device shown in FIG. 3B, a threaded bolt 108 is likewise provided which, however, is accommodated in a tapped hole in the steering-brake block 30 and has its end face 110 braced against the other side of the vehicle body panel 96. By way of a slot 112 the turning of the threaded bolt 108 is achieved; and by way of a counter nut 114, the bolt can be secured in position.

By means of the adjusting device described in connection with FIGS. 3A and 3B, tolerances can be compensated for which result from the vehicle construction, so that the pivot point of the double pedal can be set independent of the form of the steering-brake block.

Figure 4:
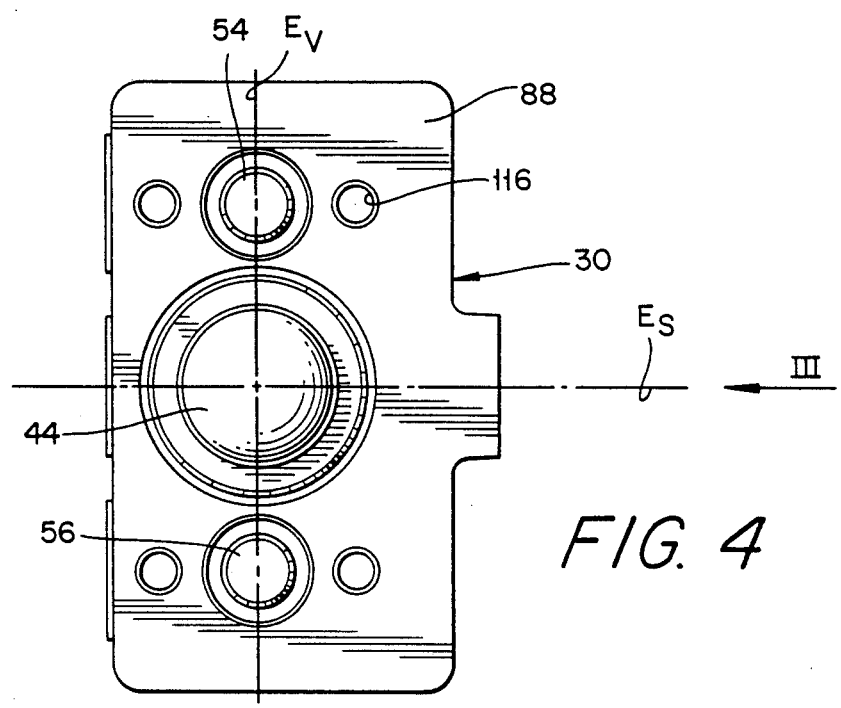
FIG. 4 is a front view of the steering-brake unit of FIG. 3 in the direction indicated by arrow IV in FIG. 3, with the vehicle body panel taken away.

In FIG. 4, tapped holes 116 are depicted which serve to screw the steering-brake block 30 to the vehicle body panel 96.

Figure 5:
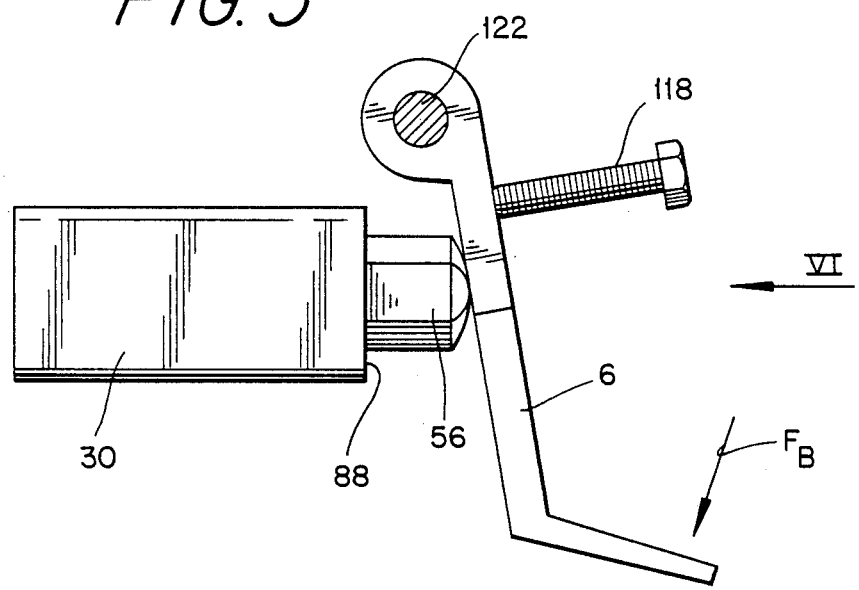
FIG. 5 is a side view of the double pedal associated with the steering-brake system.
Figure 6:
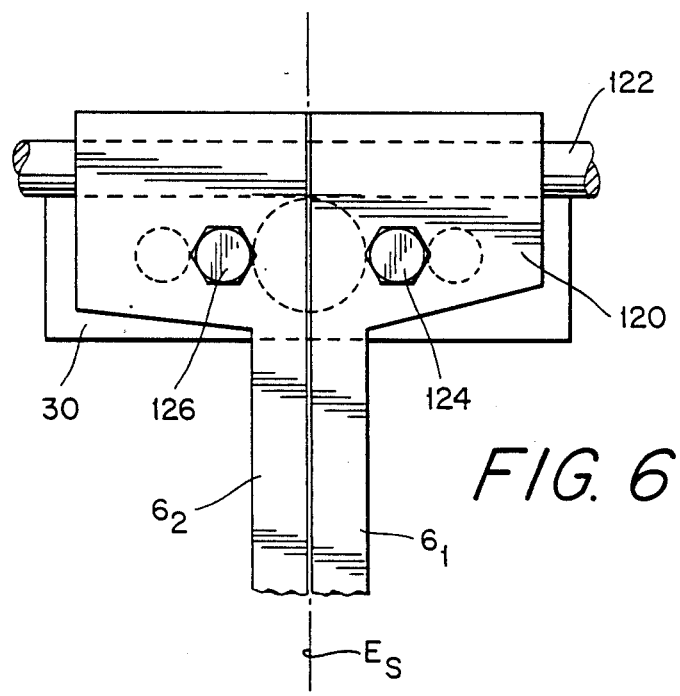
FIG. 6 is a front view of the double pedal in the direction indicated by arrow VI in FIG. 5.

FIGS. 5 and 6 depict the manner in which the reversing valves 10 and 12 and the brake valve 4 are actuated by the double pedal. Shown in FIGS. 5 and 6 is the steering-brake block 30, from whose face 88 the valve bodies 56 and 54 and the trunk piston 44 project. The ends of the valve bodies are made in calotte shape and are in contact with the double pedal 6, which is shaped symmetrically with the symmetry plane $E_S$ (see FIG. 6). By way of the restoring springs 14 and 16, the half-pedals $6_1$ and $6_2$ are pressed against a set screw 118, so that the rest position of the half-pedals $6_1$ and $6_2$ can be set.

From FIG. 6 it can be seen that the double pedal 6 is T-shaped; the pivoting of the half-pedals and the engagement thereof with the valve bodies 44, 54 and 56 takes place in the region of a crossbar 120 defined by the half-pedals. The half-pedals $6_1$ and $6_2$ are mounted on a common axle 122, which is attached to the vehicle body. Screwheads 124, 126 of set screws for the half-pedals $6_1$ and $6_2$ are provided which are located at different places than the set screw 118 shown in FIG. 5. When the double pedal 6 is actuated, the braking force $F_B$ is applied to both half-pedals as shown by the arrow in FIG. 5. The two reversing valves are then opened at the same time. Pressure which builds up in accordance with the characteristic of the brake-valve spring assembly, is fed by way of the brake-pressure ports 40 and 42 to the brake lines $B_R$ and $B_L$.

When one of the two half-pedals is actuated, for example, the right half-pedal $6_1$, the trunk piston 44 of the brake valve 4 is moved by the respective half of the crossbar 120 together with the valve body 54 of the reversing valve 10 associated with the vehicle right side, against the force of the restoring spring 14. The valve body 54 first closes the connection of the wheel-brake cylinder to the reservoir, and directly after that opens the connection of the brake valve 4 to the associated wheel-brake cylinder. Again in accordance with the characteristic of the assembly 46, 48, the brake pressure in the pertinent wheel-brake cylinder builds up by way of the brake-pressure port 40 and the valve body 54. The valve body 56 that is not actuated remains in the closed position and keeps the connection between the brake-pressure port 42 and the brake-line port 64 closed. The brake-line port 64 in this position has its pressure reduced by the still-open connection to the reservoir, so that the vehicle now can be turned in a tight-turning radius with the aid of braking on one side of the vehicle.

A brake-steering of the vehicle can be initiated from a braking phase produced by simultaneous actuation of all of the valves 4, 10 and 12 by releasing one of the two half-pedals $6_1$ and $6_2$. The half-pedal in question is pressed by the associated restoring spring of the reversing valve against the set screw 124 or 126, as a result of which a connection between the associated wheel-brake cylinder and the reservoir is produced. At the same time, the connection of the wheel-brake cylinder to the associated brake-pressure connection is interrupted, which makes brake-steering operation possible directly after a braking with both sides of the vehicle, without the entire vehicle brake having to be released first.

Of course, the invention is not confined to the specifically described variants of the steering-brake system. Thus, it is possible, for example, instead of a hydraulic system, to employ a pneumatic system to operate the steering-brake system.

Furthermore, it is not a requisite that the valve bodies of the reversing valves should operate against reservoir pressure. Rather, it is also possible to provide a different source of suitably low pressure.

In a further deviation from the form of construction described, it can be advantageous to adjust the reversing valves separately with respect to the measurement $M_V$ by which they project beyond the face of the steering-brake block 30.

Finally, it is also possible to control several pairs of reversing valves by means of one double pedal.

The brake-valve device that functions as a brake-pressure-generating device, instead of being made up of a brake valve, can be made up of a brake cylinder, particularly a main brake cylinder, which is included in the steering-brake block.

In the form of construction described, the preference was for adjusting the actuation of the reversing valves to the movement of the brake-valve body or of the main brake cylinder in such a way that the pressure buildup in the line coming from the brake valve or from the main brake cylinder occurs only when the reservoir connection of the reversing valve is closed. The described positive overlap of the control edges on the reversing valve is admittedly practical for this mode of operating, but is not a requisite. Just as reliable an operation could be achieved with an overlap of zero or even with a negative overlap. To be sure, it is advantageous to see to it that in the case where the brake valve device has a main brake cylinder included in the steering-brake block, this cylinder can be continuously moved as pressure builds up gradually in the brake-pressure line.

The invention thus creates a fluid-operated, preferably hydraulic steering-brake system, particularly for off-road vehicles, with a brake-pressure-generating device (for example, in the form of a brake valve or a main brake cylinder for delivering a brake pressure) and a reversing-valve device with which, as a function of the actuation of a double pedal, an asymmetric pressure impact can be brought about on a left and right brake-line circuit. The reversing-valve device is made up of at least one pair of reversing valves, each associated with a brake line for the left and the right side, with the valve bodies being included together with the brake-valve device in a common steering-brake block. The valve bodies of the reversing valves in each case are moved against a force independent of the brake pressure by an associated half-pedal at the same time as the brake-pressure-generating device is actuated, from a position connecting the wheel-brake cylinder with the tank to a position that blocks the tank connection and switches the brake pressure to the wheel-brake cylinder. With this construction of the steering-brake system, the result is a maximum of driving safety combined with a very low requirement for space.

Although the present invention has been described in connection with preferred embodiments thereof, it will be appreciated by those skilled in the art that additions, substitutions, modifications, and deletions not specifically described may be made without departing from the spirit and scope of the invention as defined in the appended claims.

What is claimed is:

1. Fluid-operated steering brake system for selectively operating one or both of two wheel brake cylinders located on opposite sides of a vehicle, comprising:
    a high pressure fluid source,
    a low pressure fluid region,
    a steering-brake unit comprising:
        a brake-valve device interposed between said pressure source and said wheel brake cylinders, and
        first and second reversing valves each interposed between said brake-valve device and a respective one of said wheel brake cylinders for conducting pressurized fluid from said brake valve device to said respective wheel brake cylinder, each of said reversing valves being movable against a restoring force independent of pressurized braking fluid from a first position communicating said respective wheel brake cylinder with said low pressure region to a second position communicating said respective wheel brake cylinder with high pressure fluid received from said brake-valve device, each of said reversing valves comprising:
        a housing forming a brake-line port communicating with a respective wheel brake cylinder, and a brake pressure port communicating with said brake-valve device for receiving pressurized fluid therefrom,
        a movable valve body including spaced lands defining channel means which communicate said brake-line port selectively with said brake pressure port and said low pressure region, one of said lands being configured to overlie said brake pressure port in said first position of said reversing valve to block said brake pressure port from both said brake line port and said low pressure region,
        means defining said restoring force for biasing said movable valve body to said first position wherein said one land blocks said brake pressure port from both said brake line port and said low pressure region, and
    actuating pedal means comprising half-pedals each associated with said brake valve device and a respective one of said reversing valves, whereby depression of one half-pedal actuates said brake valve device and a respective reversing valve, and depression of both half-pedals actuates said brake valve device and both of said reversing valves, either of two depressed half-pedals being releasable while the other half-pedal remains depressed, whereupon said one land associated with said released half-pedal is moved to said position blocking said brake pressure port from both said brake line port and said low pressure region so that the braking pressure associated with the still depressed half-pedal is not influenced in any way whatsoever.

2. Steering-brake system according to claim 1, wherein said channel means arranged to communicate the respective wheel brake cylinder with the reservoir before communicating said wheel brake cylinder with the high pressure fluid source.

3. Steering-brake system according to claim 2, wherein each valve body contains an internal passage communicating said surface with said low pressure region.

4. Steering-brake system according to claim 3, wherein said brake-valve device is arranged symmetrically relative to said reversing valves.

5. Steering-brake system according to claim 4, wherein said brake-valve device includes a valve body arranged to be displaced by said pedal means against the force of a restoring spring and the brake pressure feedback.

6. Steering-brake system according to claim 5, wherein said pedal means is symmetric with a reference plane extending midway between said restoring valves.

7. Steering-brake system according to claim 1 including a panel in said vehicle, said pedal means being pivotably connected to said panel, said steering-brake unit comprising a housing encasing said brake valve device and said reversing valves, said housing attached to said panel.

8. Steering-brake system according to claim 7 including adjusting means for adjusting the location of said housing relative to the pivot connection of said pedal means with said panel.

9. Steering-brake system according to claim 8, wherein said adjusting means comprises threaded bolts carried by one of said panel and housing and having an end bearing against the other of said panel and housing to move the latter when rotated.

10. Steering-brake system according to claim 1, wherein said pedal means is T-shaped and includes a cross-bar portion defined by aligned portions of both half-pedals, said cross-bar arranged to actuate said reversing valves and said brake valve device.

11. Steering-brake system according to claim 10 including a shaft common to said half-pedals for pivotally supporting said half-pedals.

12. Steering-brake system according to claim 1 including an adjustable stop member for defining a rest position of said half-pedals.

13. Steering-brake system according to claim 1, wherein said brake valve device includes a slidable valve body, the axes of all of said valve bodies disposed in a common plane.

14. Steering-brake system according to claim 1, wherein said brake valve device is constructed such that the pressure intensity of the high pressure fluid delivered by said brake valve device varies in accordance with the amount of depression of said pedal means.

15. Steering-brake system according to claim 1, wherein said high-pressure source comprises a source of hydraulic fluid.

* * * * *